Jan. 15, 1924.
S. CUPER ET AL
1,481,125
ICE CREAM DIPPER
Filed Aug. 30, 1922
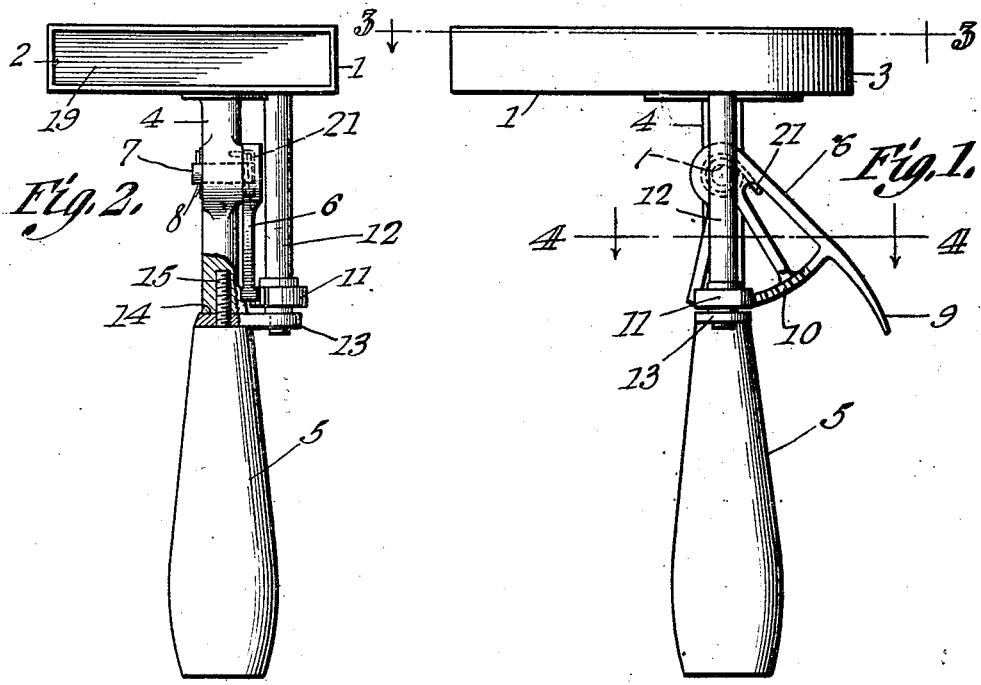
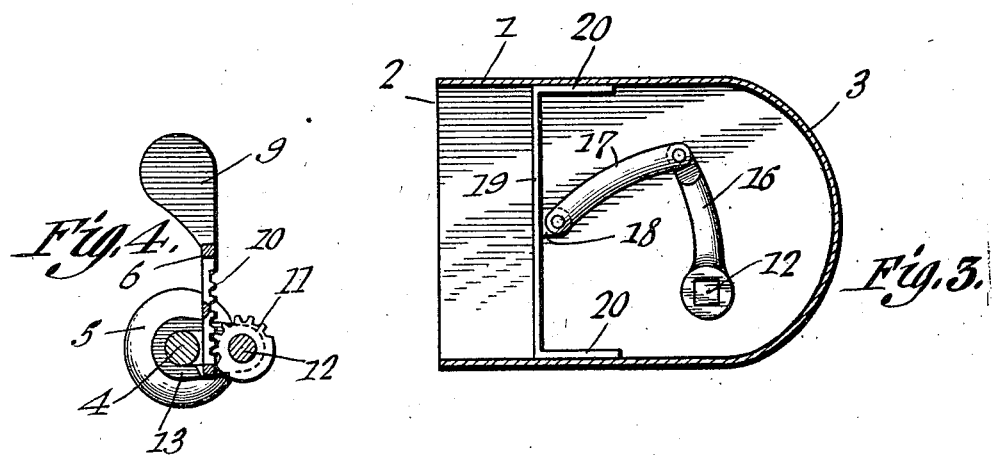
S. Cuper
A. Daniels    Inventors
F. Klens
By C. A. Snow & Co.
Attorneys Patented Jan. 15, 1924.

1,481,125

UNITED STATES PATENT OFFICE.

STEPHEN CUPER, ANTHONY DANIELS, AND FRANK KLENS, OF SCRANTON, PENNSYLVANIA.

ICE-CREAM DIPPER.

Application filed August 30, 1922. Serial No. 585,216.

*To all whom it may concern:*

Be it known that we, STEPHEN CUPER, ANTHONY DANIELS, and FRANK KLENS, citizens of the United States, residing at Scranton, in the county of Lackawanna and State of Pennsylvania, have invented a new and useful Ice-Cream Dipper, of which the following is a specification.

This invention relates to a dipper designed primarily for use in handling ice cream used in making confections known as ice cream sandwiches. It has been the practice, heretofore, to cut thin slices of ice cream from cakes or bricks but this has necessarily required the use of ice cream in brick form and which is not always available to venders.

One of the objects of the present invention is to provide a dipper so shaped that bulk ice cream can be gathered up and molded into a thin layer or cake properly proportioned to be used in making ice cream sandwiches and similar confections.

Another object is to provide a device of this character which is simple and compact in construction and easy to manipulate.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1 is a side elevation of the device.

Figure 2 is a front view thereof.

Figure 3 is a section on line 3—3, Figure 1.

Figure 4 is a section on line 4—4, Figure 1.

Referring to the figures by characters of reference 1 designates a scoop preferably oblong in cross section. This scoop is open at one end as shown at 2 while the other end thereof is preferably closed and rounded as shown at 3. A stem 4 is fixedly connected to one face of the scoop and is perpendicular thereto, this stem being formed with a handle 5. A segment 6 is pivotally mounted on one side of the stem 4, this segment being provided with a stud 7 journaled in the stem and held in position in any suitable manner, as by means of a cotter pin 8. The segment has a finger piece 9 extending therefrom at a point where it can be pressed conveniently by a finger of the hand grasping handle 5.

Segment 6 has an arcuate rack 10 thereon constantly in mesh with a segmental gear 11 secured to one end portion of a shaft 12. One end of this shaft is journaled in an ear 13 extending laterally from the stem 4, said ear being preferably clamped against a shoulder 14 on the stem by the handle 5, there being a threaded stem 15 projecting from the handle and into the stem 4.

One end of the shaft 12 extends into the scoop 1 and has a curved arm 16 secured thereto. This arm is connected by a link 17 to an ear 18 projecting inwardly from the center of a follower 19 slidably mounted within the scoop. Guide ears 20 are extended from the ends of the follower and are adapted to slide upon the inner faces of the side walls of the scoop so as to prevent the follower from wedging within the scoop.

A spring 21 is mounted on the stud 7 and exerts a constant pressure against the segment 6 so as to hold the segment normally positioned as shown in Figure 1. When the parts are thus located the follower 19 is at its innermost position within the scoop 3.

In using the device the ice cream is scooped up so as to form a compact cake in front of the follower 19. The user then pulls the finger piece 9 toward the handle 5. This will cause the rack 10 to rotate the segmental gear 11 with the result that arm 16 will thrust through link 17 against the follower 19 and cause the cake to be ejected from the scoop 1. As soon as the finger piece 9 is released the spring 21, which has been placed under increased tension by the ejection of the material, will return the parts to their normal positions.

By unscrewing the handle 5 from the stem 4 the parts can be disconnected readily.

It will be noted that the scoop forms a mold for the ice cream so that when the cake of ice cream is ejected it is of the proper proportions to be made into a sandwich.

This device can also be used for molding blocks or bricks of ice cream from bulk cream in which event the scoop would be made larger than where used in the making of sandwiches.

What is claimed is:—

1. The combination with a scoop constituting a mold, and an ejecting follower in the scoop, of a crank arm mounted to swing within the scoop about an axis extending across the interior of the scoop, a link connection within the scoop between the crank arm and the follower, a handle, and means movably mounted relative to the handle for actuating the crank arm.

2. The combination with a scoop constituting a mold and an ejecting follower in the scoop, of a handle perpendicular to the scoop, a shaft extending into the scoop, a crank arm thereon, a link connection between the crank arm and the follower, and cooperating means upon the handle and shaft for actuating the crank arm.

3. The combination with a scoop constituting a mold, and a follower slidably mounted therein, of a handle extending from the scoop, a shaft projecting into the scoop, means in the scoop and operated by the shaft for shifting the follower, a spring restrained toothed segment mounted on the handle, a gear meshing therewith and secured to the shaft, and a finger piece extending from the segment.

In testimony that we claim the foregoing as our own, we have hereto affixed our signatures in the presence of two witnesses.

STEPHEN CUPER.
ANTHONY DANIELS.
FRANK KLENS.

Witnesses:
LUCILLE DUGGAN,
H. WELLEMS.